United States Patent [19]

Kaercher, Jr.

[11] 4,438,873
[45] Mar. 27, 1984

[54] GROUND DRIVEN TOP DRESSER UTILIZING SPECIAL CLUTCH MECHANISM

[75] Inventor: William C. Kaercher, Jr., Minneapolis, Minn.

[73] Assignee: Turfco Manufacturing, Inc., Minneapolis, Minn.

[21] Appl. No.: 315,756

[22] Filed: Oct. 28, 1981

[51] Int. Cl.³ .............................................. A01C 15/16
[52] U.S. Cl. ................................... 222/616; 222/625
[58] Field of Search ............... 222/616, 618, 622, 623, 222/624, 625; 198/310, 642; 192/46, 50, 89 A, 95 S

[56] References Cited

U.S. PATENT DOCUMENTS

| | | | |
|---|---|---|---|
| 2,092,104 | 9/1937 | Bowden | 192/89 A |
| 2,252,690 | 8/1941 | Arndt | 222/624 X |
| 2,556,409 | 6/1951 | Armstrong | 198/310 X |
| 3,013,695 | 12/1961 | Caldwell | 222/622 X |
| 4,204,293 | 5/1980 | Schlapman | 192/46 X |
| 4,288,008 | 9/1981 | Amblard et al. | 222/614 X |

Primary Examiner—Joseph J. Rolla
Assistant Examiner—Thomas Fitzgerald
Attorney, Agent, or Firm—Peterson, Palmatier, Sturm, Sjoquist & Baker, Ltd.

[57] ABSTRACT

An octogonally configured cam has four flats located radially outward a greater distance than the four intervening flats. The various flats are successively engageable with a pivotal arm to engage and disengage a clutch mechanism and thus start and stop an endless belt conveyor along with the starting and stopping of a cylindrical brush. Both the conveyor and brush are ground-driven through a chain and cog wheels, the size of the cog wheels being such that the brush is rotated at faster speed than the conveyor. The position of an indicating rod signifies when the clutch mechanism is engaged or disengaged.

18 Claims, 8 Drawing Figures

GROUND DRIVEN TOP DRESSER UTILIZING SPECIAL CLUTCH MECHANISM

BACKGROUND OF THE INVENTION

1. Field of the Invention

This invention relates generally to top dressers, and pertains more specifically to a top dresser having a conveyor that is ground-driven through a special clutch mechanism.

2. Description of the Prior Art

A number of top dressers have been previously devised. Some are ground-driven; other make use of separate engines for causing the top soil or sand to be distributed on the turf, such as a golf green, fairway or athletic field.

Most of the prior art top dressers are unduly complex and require a considerable amount of maintenance. Furthermore, the controls in most instances are overly complicated, requiring undue attention on the part of the operator. In some instances, the operator must make various adjustments from the utility vehicle towing the ground-driven top dresser which are usually inconvenient to make. In other words, the operator, who is riding on the utility vehicle, is located a considerable distance from the top dressing apparatus, and any control rods or cables can prove to be cumbersome and frequently difficult to manipulate in such situations.

SUMMARY OF THE INVENTION

Accordingly, a general object of my invention is to provide a ground-driven top dresser that is simple, both as to its structure and to the manner in which it is operated.

Another object of the invention is to provide a ground-driven top dresser that will dispense a ribbon of material from its hopper at a preselected rate independently of the speed that the top dresser is being pulled. In this regard, an aim of the invention is to vary the amount in accordance with the speed that the top dresser is pulled: if the top dresser is advanced at a relatively slow speed, the amount of material contained in the ribbon of material that is being distributed onto the turf is automatically lessened, whereas the converse occurs when the speed of the top dresser is increased. It is also an aim of the invention to stop the dispensing action whenever the top dresser stops. Hence, it is within the purview of my invention to obviate any need for readjusting the gate associated with the hopper in which the top soil or sand is contained, even though speed conditions vary appreciably, until the dispensing rate is to be changed. Stated somewhat differently, my invention causes the amount of material that is dispensed onto the ground to remain the same for each setting irrespective of the speed at which the top dresser is pulled.

A further object of the invention is to provide a ground-driven top dresser that can be pulled by a utility vehicle at various speeds, frequently at a relatively high speed, and yet not dispense any of the dirt or other material contained in the hopper, all under the supervisory control of the operator driving the utility vehicle. Hence, when moving from one area to be top dressed to another location, the utility vehicle can be operated at its full speed, or substantially at its full speed, without dispensing any of the material contained in the hopper, the operator only having to pull a rope or cable to effect an engagement of the clutch mechanism that connects the conveyor to the wheels of the top dresser when desiring to dispense material. Still further, it is within the contemplation of the invention to provide a top dresser that can be backed up, as well as negotiating various turns, without having to close the hopper gate to prevent a dispensing of material.

Yet another object of the invention is to provide a top dresser having a hopper that can be filled with a front end loader. In the past, it has been common practice to load the hopper manually with shovels. However, the top dresser that forms the subject of this invention has such dimensions that it can be loaded mechanically, such as with the front end loader just alluded to, thereby reducing the amount of time and labor.

Another object of the invention is to provide an endless-belt conveyor constrained for movement in a path beneath the hopper so as to dispense a uniform ribbon of soil or sand.

Also, an object of the invention is to provide a top dresser that will be rugged and longlasting. In this regard, an aim of the invention is to provide a clutch mechanism that will enable the operator to cause the conveyor to operate when the clutch is engaged, and to stop the conveyor when the clutch is disengaged. In this regard, the operator needs only to pull a single rope or cabe, one pull causing the clutch mechanism to be engaged with the ground wheels and a second pull causing the clutch to be completely disengaged so that no dispensing occurs. It is also planned that a visual indication be provided denoting whether the clutch mechanism is engaged or disengaged, the indicating means being easily seen by the operator from the towing vehicle on which he is riding.

Another object is to provide a cylindrical or rotary brush that is automatically operated in concert with the conveyor so that when the conveyor is operated at any of a number of speeds, the brush will be rotated at a speed correspondingly proper for the speed at which the conveyor is operated. In this latter regard, the brush is rotated so as to further pulverize the already relatively fine material contained in the hopper, doing so as it leaves the conveyor, the rotary brush forcefully propelling the material onto the turf to be dressed.

Briefly, my invention envisages a top dresser adapted to be pulled by a utility vehicle over the turf that is to have the soil or sand distributed thereon. The dual supporting wheels are mounted on a shaft which they drive through the agency of two overriding clutches so that the conveyor will be operated via a manually engageable and disengageable clutch mechanism at a speed in accordance with which of the wheels are rotating faster. When the top dresser is moved rearwardly, there is no movement of the conveyor. It is planned that the manually operable drive clutch mechanism be spring-biased into an engaged condition.

By means of a pivotal arm, which overcomes the biasing action of the coil spring providing such action, the normally engaged drive clutch mechanism can be readily disengaged. The arm is acted upon by an octagonally configured cam having eight flats, four of which are radially located outwardly at a greater distance than the intervening four flats. Thus, when one of the flats having a greater radial spacing from the shaft on which the octagonally configured cam is mounted is engaged with the pivotal arm, the coil spring is compressed so as to disengage the clutch halves. Each time that the operator pulls on a rope or cable, an octagonally configured cam is angularly rotated from one position to the next. By alternating the flats, only a 45° rotation of the cam is necessary in order to effect an engagement or disengagement of the clutch mechanism. This is accomplished manually through a one way clutch on the mounting shaft. The operator is visually apprised at all times as to whether the manually operable clutch mechanism is engaged or not.

A specially constructed conveyor involves an endless belt that moves beneath the bottom of the hopper so that the material to be distributed onto the turf is gravitationally deposited onto the conveyor belt. The conveyor belt is driven by two endless chains, one at each end of the belt, that are entrained about cog wheels mounted adjacent the ends of a shaft which is driven via the above-mentioned manually operable clutch mechanism and which chains encircle cylindrical, toothless rollers on a second shaft.

Also driven via the same manually operable clutch mechanism is a rotary brush that receives the material as it is discharged from the conveyor, propelling the discharged material downwardly into the turf to be dressed.

DESCRIPTION OF THE PREFERRED EMBODIMENT

Figure 1:
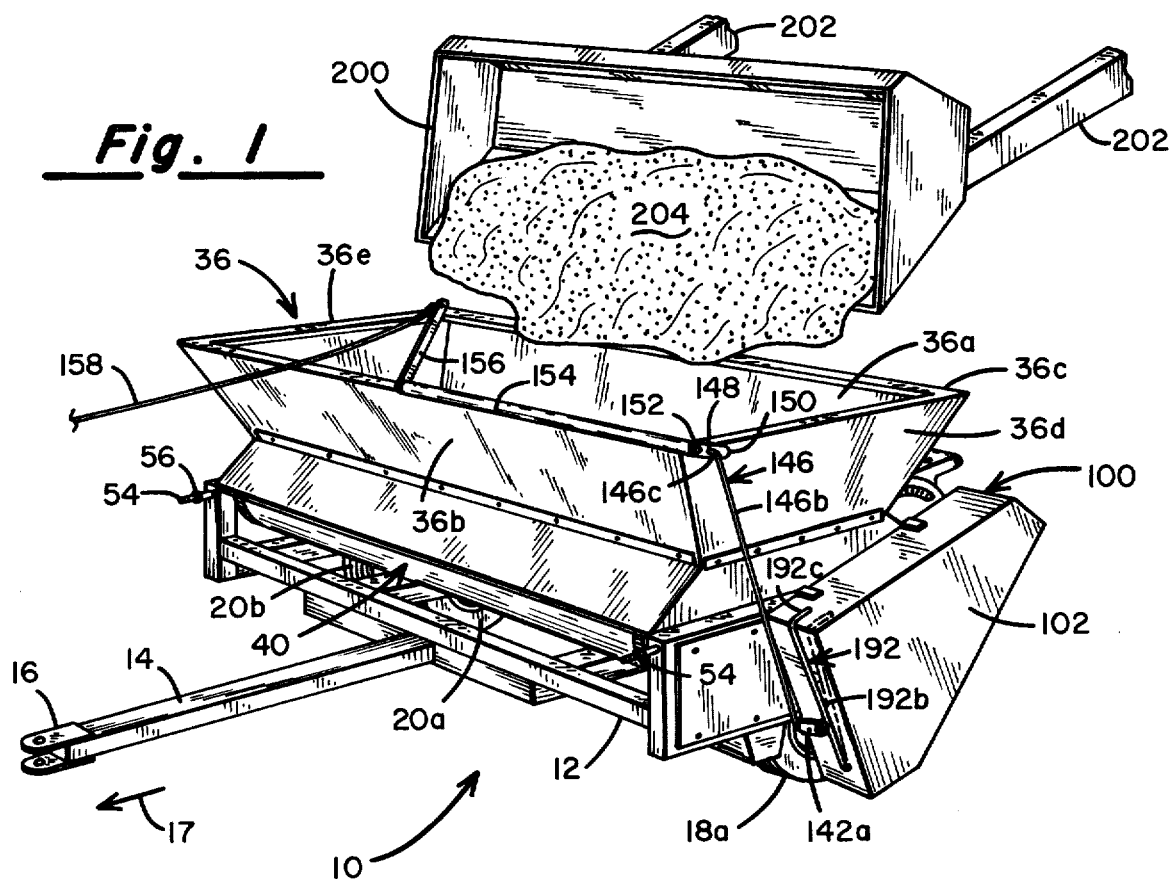
FIG. 1 is a perspective view of a top dresser exemplifying my invention, the bucket of a front end loader being depicted over the top dresser in the process of dumping material into the hopper of the top dresser.
Figure 2:
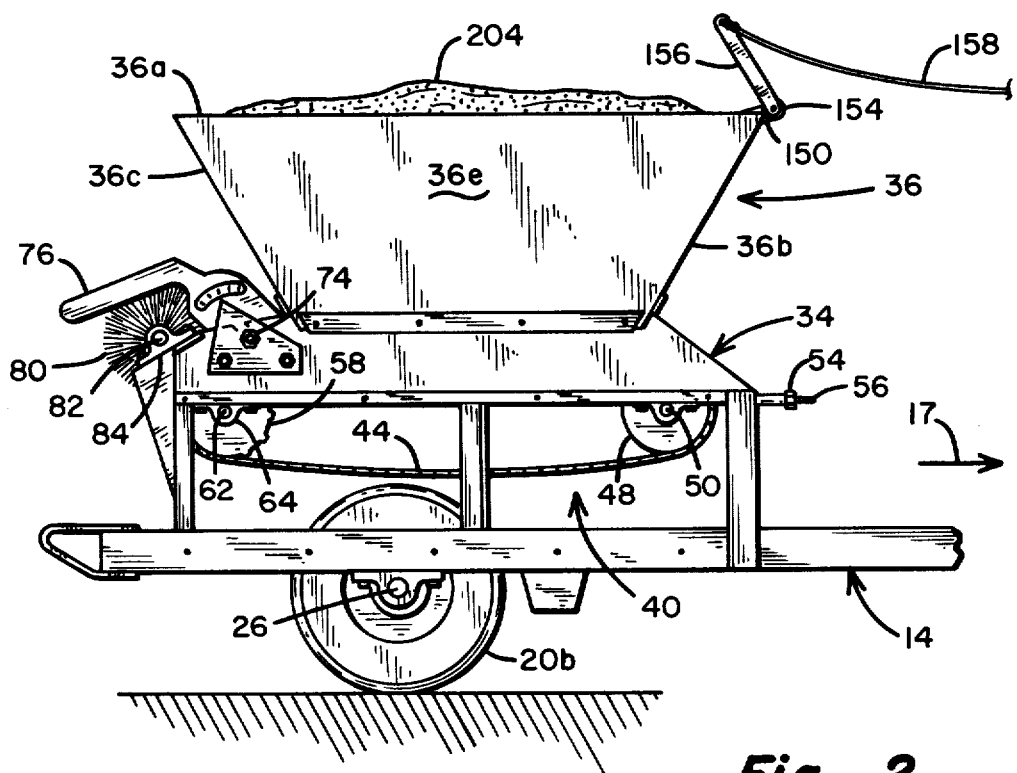
FIG. 2 is a side elevational view of my top dresser taken from the right side.

FIG. 1 is a perspective view of a top dresser illustrating my invention, the top dresser being denoted generally by the reference numeral 10. The dresser 10 comprises a frame 12 having a drawbar 14 with a portion of a hitch 16 being shown by which the top dresser 10 can be coupled to a towing tractor or utility vehicle and pulled in the direction of the arrow 17.

Figure 3:
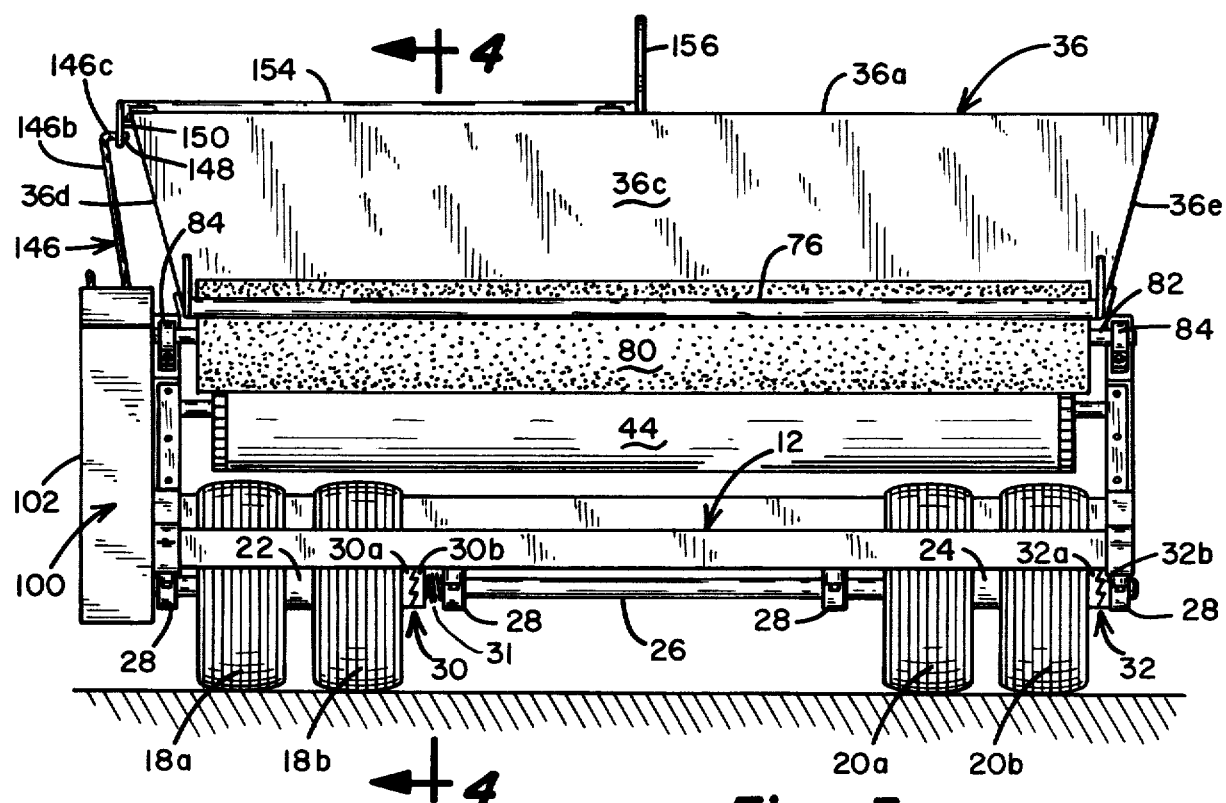
FIG. 3 is a rear elevational view of the top dresser.

As best seen in FIG. 3, the top dresser 10 has two dual sets of wheels 18a, 18b and 20a, 20b rotatably mounted on tubular or quill shafts 22 and 24, respectively. The quill shafts 22, 24 encircle a transverse shaft 26 which is journaled for rotation by means of pillow block bearings 28 mounted to the underside of the frame 12. It is important to note that a pair of overriding clutches 30, 32 are incorporated into the shaft arrangement. Inasmuch as the clutches 30, 32 are conventional, they need not be described in detail. In order to portray what occurs, the clutch 30 has been diagrammatically depicted as having one jaw member 30a driven by one end of the quill shaft 22 and a second jaw member 30b slidably keyed or splined to the drive shaft 26, being resiliently urged into engagement with the jaw member 30a by a coil spring 31. Similarly, the clutch 32 diagrammatically includes a jaw member 32a driven by one end of the other quill shaft and a jaw member 32b resiliently urged into engagement with the jaw member 32a by a coil spring (not shown but identical to the spring 31).

It should be understood that whenever the clutch member 30a of the clutch 30 rotates faster than the clutch member 32a of the clutch 32, it will drive the shaft 26 through the member 30b, the clutch member 32b then overriding the member 32a. By the same token, whenever the clutch member 32a of the clutch 32 rotates faster than the clutch member 30a of the clutch 30, it will drive the shaft 26 through the member 32b, the clutch member 30b under these conditions overriding the member 30a. When both sets of wheels 18 and 20 are rotating at the same speed, as happens when the top dresser is being pulled forwardly in a straight line, then both clutch members 30a, 32a produce a driving action to the shaft 26 through the clutch members 30b and 32b. It should be recognized that when the top dresser 10 is pushed rearwardly, then both members 30a, 32a override the members 30b, 32b, respectively, with the consequence that the shaft 26 is not rotated. More will be said hereinafter concerning the use of the shaft 26.

The frame 12 has mounted thereon a superstructure labeled 34 which supports a hopper 36. The hopper 36 has an open top 36a, a sloping front wall 36b, a sloping rear wall 36c, sloping end walls 36d, 36e and an open bottom 36f.

It will be appreciated that golf greens, fairways and athletic fields require almost constant grooming which includes the application of an appropriate top dressing material. A conveyor 40 is disposed so that an endless belt 44 thereof passes beneath the hopper 36, more specifically under its open bottom 36f, so as to have gravitationally discharged thereon whatever material is contained in the hopper 36 that is to be used in dressing the turf.

Figure 5:
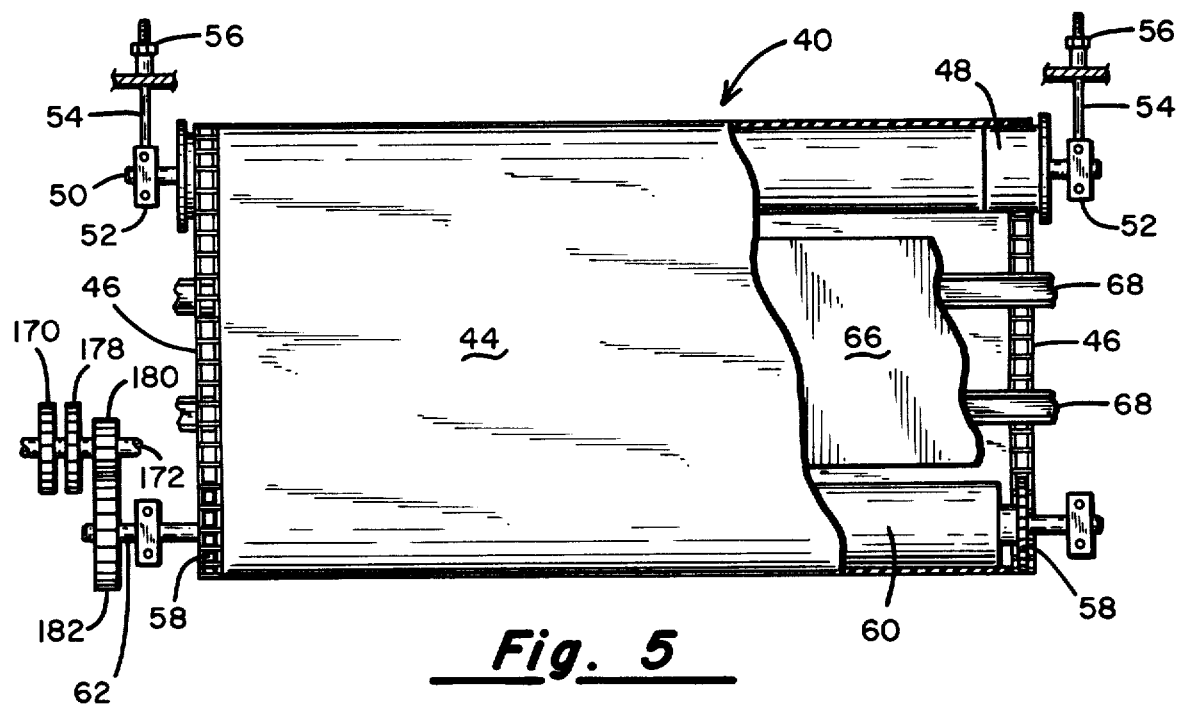
FIG. 5 is a top plan view of the conveyor utilized in my top dresser, portions thereof having been sectioned in order to better illustrate the construction thereof.

It will be observed from FIG. 5 that the belt 44 has integrally attached to its marginal edges a pair of chains 46. The forward ends of the chains 46 pass over cylindrical and untoothed rollers 48 rotatably mounted on a transverse shaft 50 that is journaled for rotation in pillow block bearings 52. The bearings 52 are adjustable in a fore and aft direction by means of threaded rods 54, each of which has a nut 56 thereon. The conveyor 40 further includes a pair of cog wheels 58 which are secured to the opposite ends of a cylindrical roller 60 mounted for rotation on a transverse shaft 62, the ends of the shaft 62 being mounted in pillow block bearings 64 that are attached to the superstructure 34.

The endless belt 44 passes over a platen or bed plate 66 that is fixedly supported via a pair of inverted channel members 68. The ends of the channel members 68 are mounted to side portions of the superstructure 34. To reduce friction between the platen 66 and the underside of the belt 44, the upper side of the platen 66 is preferably coated with a suitable plastic.

Figure 4:
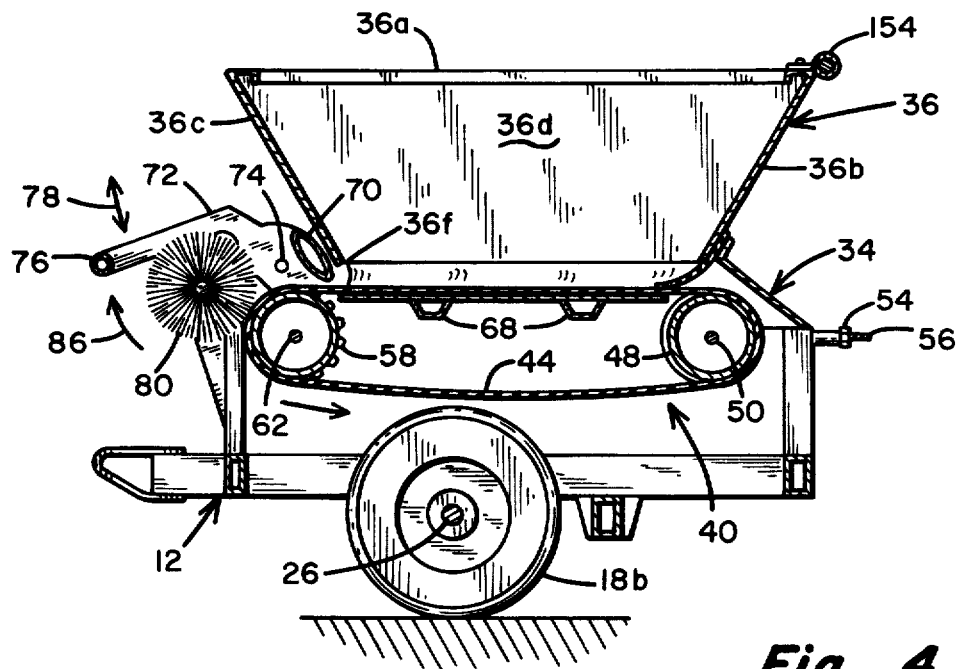
FIG. 4 is a sectional view taken in the direction of line 4—4 of FIG. 3.

At this time, attention is directed to an adjustable gate 70 carried at one end of an arm 72 (FIG. 4). The other end of the arm 72 is mounted for pivotal movement on a pivot shaft 74 having a handle 76 associated therewith. The handle 76 can be manually actuated in either direction as denoted by the double-headed arrow 78 to determine the position or setting of the gate 70.

The top dresser 10 further includes a cylindrical or rotary bristled brush 80 that is mounted on a shaft 82 (FIG. 3), the ends of the shaft 82 being journaled in pillow block bearings 84 that are fastened to appropriate portions of the superstructure 34. The cylindrical brush 80 is rotated in the direction of the arrow 86 (FIG. 4) to propel the material from the conveyor 40 into the ground being dressed. The cylindrical brush 80 has a length substantially equal to the width of the hopper 36 and also to the width of the conveyor belt 44, as can be appreciated from FIG. 3.

At this time, reference will be made to a manually operable clutch mechanism (FIGS. 7 and 8) denoted generally by the reference numeral 88, being comprised of a first jaw member 90 that is fixedly attached to the shaft 26 that is driven via the earlier-mentioned overriding clutches 30, 32 as the wheels 18, 20 traverse the ground. A second jaw member 92 belonging to the clutch mechanism 88 is slidably and rotatably disposed on the shaft 26, the member 92 having a sprocket 94 integral therewith. It will be discerned that a biasing coil spring 96 encircles the shaft 26, the spring 96 reactively bearing against a collar 98 axially secured to the shaft 26. More will be said presently concerning the specific manner in which the coil spring 96 biases the clutch mechanism 88 into its engaged condition.

Figure 6:
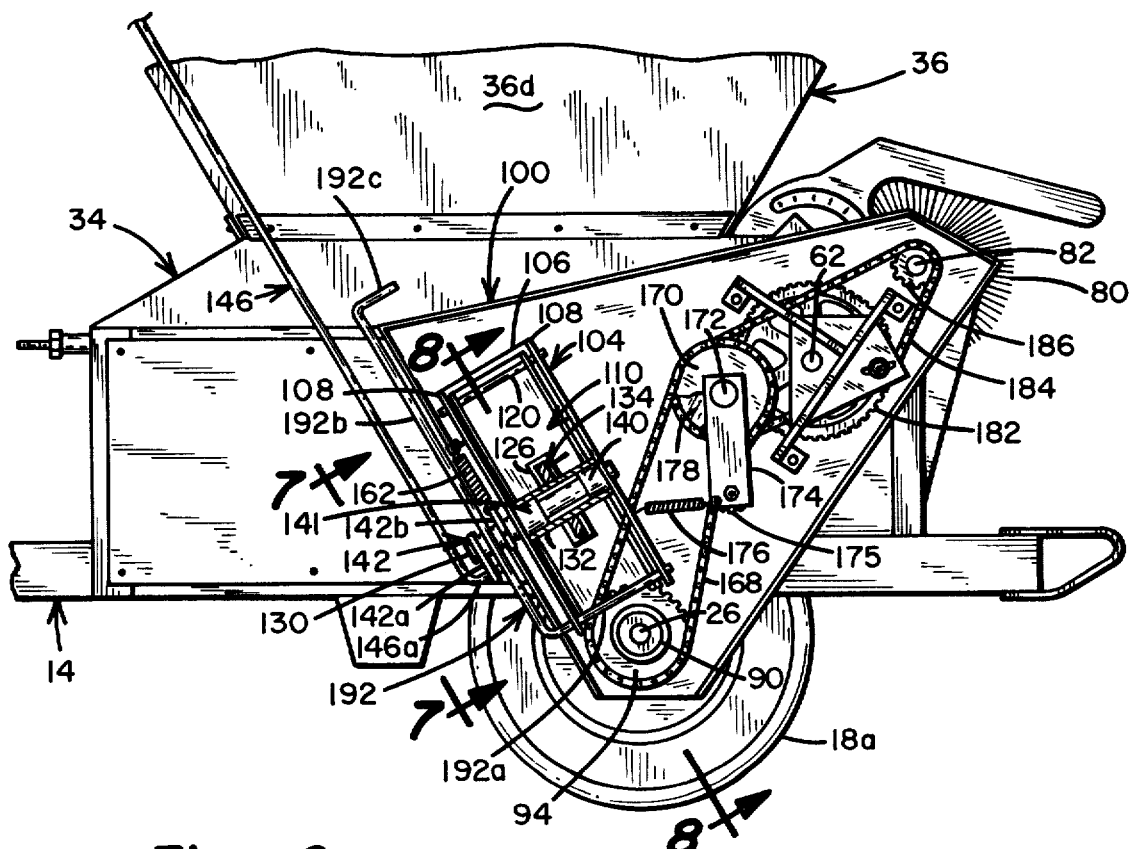
FIG. 6 is an end elevational view taken from the left side 1 but with the side cover or chain guard removed in order to expose to view the manually operable clutch mechanism and the manner in which the conveyor and brush are driven.

Parts shown in FIG. 6 and now to be referred to are housed in a casing indicated generally by the reference numeral 100 which is attached to one side of the frame 12. The casing 100 with its side cover or face plate 102 in place appears in FIGS. 1 and 3; the cover or plate 102 has been removed in FIG. 6, however.

Playing a role in the disengagement of the clutch mechanism 88 is a U-shaped bracket labeled 104 having a web portion 106 and parallel side walls 108. Literally nested between the side walls 108 is a channel-shaped arm 110 having a web 112 and side flanges 114. There is a semicircular notch 116 adjacent the bottom edge of the web 112 so that the lower end portions of the side flanges 114 in effect straddle the shaft 26. Each flange 114 has a pin 118 (FIG. 7) extending therethrough. Actually, each pin 118 projects to either side of its flange 114 for a reason soon to be explained. A pivot pin 120, as can be discerned from FIGS. 7 and 8, mounts the channel-shaped arm 110 for pivotal movement, the ends of the pin 120 being anchored in the side walls 108 of the U-shaped bracket 104. A shim 124 and a wear plate 126 are secured to the web 112 of the arm 110 by means of screws 128, as can be understood from FIG. 8.

A shaft 130 is supported in the side walls 108. Encircling the shaft 130 is a tube 132 on which is integrally mounted an octagonally configured cam 134 having eight flats labeled 136a, 136b, 136c, 136d, 136e, 136f, 136g and 136h. Close inspection of FIG. 8 will reveal that the flats 136a, 136c, 136e and 136g are spaced from the tubular shaft 132 at equal radial distances somewhat less than the equal radial distances of the intervening flats 136b, 136d, 136f and 136h.

Figure 8:
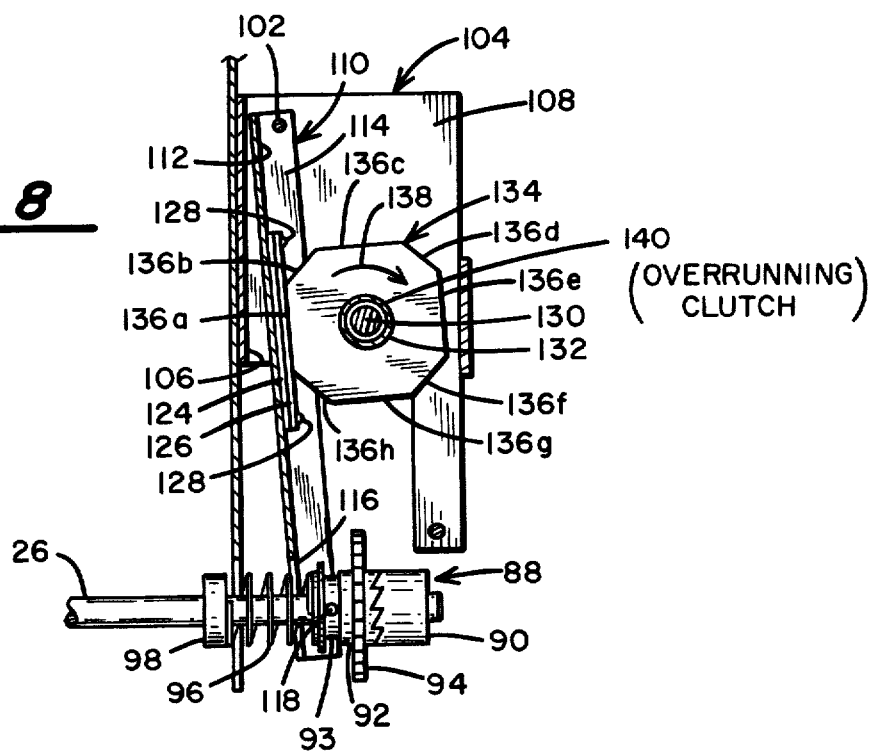
FIG. 8 is a fragmentary sectional view taken in the direction of line 8—8 of FIG. 6, but with the clutch mechanism engaged.

As can be appreciated from FIG. 8, the clutch mechanism 88 is engaged in this view. This is by reason of the flat 136a, which is not far from the center of rotation of the cam 134 as the two adjacent flats 136b or 136h, and which enables the arm 110 to pivot sufficiently in a counterclockwise direction as viewed in FIG. 8 to effect engagement of the jaw member 92 under the influence of the spring 96, the right end of the spring 96 bearing against the left side of the jaw member 92. The inwardly projecting portions of the pins 118 mounted in the flanges 114 of the pivotal arm 110 extend into a circumferential groove 93 formed in the member 92. In this way, when the coil spring 96 is permitted to expand, the teeth on the face of the clutch member 92 mesh with the teeth on the face of the clutch member 90. This causes the sprocket 94, being integral with the clutch member 92, to rotate when the wheels 18, 20 rotate. It will be appreciated that the pins 118, being mounted in the flanges 114 of the arm 110, shift the clutch member 92 in accordance with the cam actuated movement of the arm 110 in that the inner ends of the pins 118 extend into the groove 93 formed in the cylindrical surface of the member 92, as just explained.

The manner in which the shaft 130 is incrementally rotated or indexed so as to advance or shift the flats 136a–136h in the direction of the arrow 138 of FIG. 8 is by means of a small one way clutch 140 contained in one end of the tube 132 (FIG. 6), such as the roller clutch, type RC, or the clutch and bearing assembly, type RCB, manufactured by The Torrington Company. An Oilite bearing 141 is contained in the other end of the tube 132. The indexing is realized through the agency of a rocker arm 142 keyed to one end of the shaft 130, the rocker arm 142 having offset portions 142a and 142b. The portion 142a is outside the casing. The rocker arm 142 has a first aperture at 144 which receives therein an angled or offset end portion 146a (FIG. 6) of an actuating rod 146 having a shank portion 146b which inclines upwardly, having an angled end portion 146c (FIGS. 1 and 3) at its upper end that engages in an aperture 148 formed in a lever arm 150 attached to one end of a shaft 152 that extends through a tubular structure 154 toward the center of the hopper 36. The shaft 152 is supported by bearings within the tubular structure 154. The other end of the shaft 152 has another lever arm 156 thereon.

Figure 7:
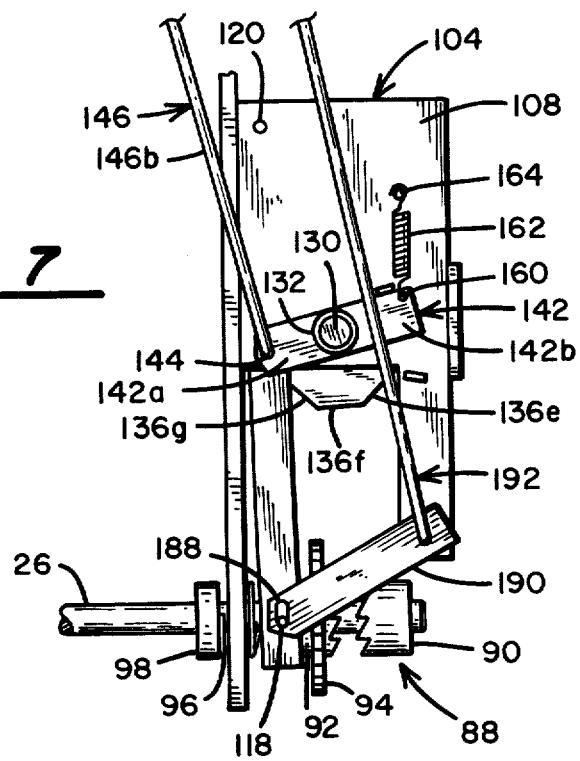
FIG. 7 is a fragmentary detail view taken in the direction of line 7—7 of FIG. 6 with the clutch mechanism disengaged.

The upper or free end of the last-mentioned arm 156 has a flexible rope or cable 158 attached thereto so that, when pulled, the shaft 152 is oscillated through a sufficient angle to cause the rocker arm 142 to be pivoted sufficiently so that the shaft 130, acting through the one-way or overrunning clutch 140, correspondingly rotates the tubular shaft 132 with the consequence that the next adjacent flat 136h on the cam 134 will be brought into juxtaposition with the wear plate 126. Inasmuch as the flat 136h is spaced a greater distance from the center of rotation of the cam 134, it follows that the arm 110 will be urged in a clockwise direction to compress the coil spring 96, withdrawing the clutch member 92 from the other clutch member 90 of the clutch mechanism 88, as can be seen in FIG. 7. The sprocket 94, when the clutch mechanism 88 is disengaged as just described, will not rotate under these circumstances as the wheels 18, 20 rotate.

It will be observed from FIG. 7 that the rocker arm 142 has another aperture 160 in addition to the earlier-mentioned aperture 144. In this way, one end of a return coil spring 162 is engaged with the rocker arm 142 by having this end inserted through the aperture 160, the other end of the spring 162 being hooked over a pin 164 projecting from the side wall 108 that is present in FIG. 7. Hence, when the arm 142 is rocked by the actuating rod 146, the spring 162 is stretched or elongated, returning the rocker arm 142 to its initial position after the operator releases his grip on the rope or cable 158. Owing to the one-way action of the clutch 140, the cam 134 remains in the position into which it has been indexed as the spring 162 returns the clutch to its actuating position, assisted in doing so by virtue of the force of the wear plate 126 against the flat 136h which force is derived from the spring 96.

From FIG. 6 it will be perceived that a chain 168 is entrained about the sprocket 94, the chain 168 extending upwardly and about a sprocket 170 mounted on a short shaft 172 projecting from the back of the casing 100. An arm 174 loosely encircles the end of the short shaft 172 in a pendulum-like manner, having an idler sprocket 175 rotatably carried at its lower or free end. Any slack in the chain 168 is taken up by the action of a coil spring 176 having one end engaged with the lower end of the arm 174 and its other end anchored to one of the side walls 108 belonging to the U-shaped bracket 104.

A segment of the sprocket 170 has been broken away to show a second sprocket 178 of similar size which is also mounted on the short shaft 172. It will be well to superimpose both sprockets 170, 178 on FIG. 5, together with a portion of the shaft 172 on which they are mounted and also a small pinion gear 180 which cannot be seen in FIG. 6 due to the sprocket 170 and the obscuring segment of the sprocket 178.

The small pinion gear 180 is in mesh with a relatively large gear 182 that is keyed to one end of the previously mentioned transverse shaft 62. In this way, the cog wheels 58, since they are mounted for rotation with the shaft 62, cause the endless belt 44 to move beneath the open bottom 36f of the hopper 36.

Entrained about the second sprocket 178 (a segment appearing in FIG. 6 but appearing fully in FIG. 5) is a chain 184 that engages a small sprocket 186 keyed to the shaft 82 on which the rotary brush 80 is fixedly mounted for rotation therewith.

Hence, whenever the clutch mechanism 88 is engaged, and the top dresser 10 is being pulled or towed across the ground, then both the conveyor 40 and the brush 80 are placed in operation. On the other hand, when the clutch mechanism 88 is disengaged, which occurs when one of the flats 136b, 136d, 136f or 136h having a greater radial distance than the flats 136a, 1346c, 136e or 136g, is bearing against the wear plate 126 fixedly attached to the web 112 of the pivotal arm 110, then the coil spring 96 is compressed, its biasing action being overcome, with the result that the clutch mechanism 88 is disengaged, as illustrated in FIG. 7 with the consequence that the conveyor 40 and the brush 80 do not operate at this time.

It has been previously mentioned that the flanges 114 of the channel-shaped arm 110 have pins 118 extending therethrough, one of which pins 118 appears in FIG. 7. While the portion of the pin 118 seen in FIG. 7 that resides between the flanges 114 coacts with the other such pin in the other flange 114 to overcome the biasing action of the coil spring 96, the portion of the pin 118 projecting toward the reader in FIG. 7 is employed in the provision of a visual indication of the engaged or disengaged status of the clutch mechanism 88.

To produce the above-mentioned indication, the pin 118 of FIG. 7 projects into a slot 188 formed in one end of a pivotal arm 190. A rod member 192 extends through the other end of the arm 190, the member 192 being fixed to the arm 190. From FIG. 6 it will be perceived that the rod member 192 is generally L-shaped, having a relatively short straight leg 192a and a relatively long straight leg 192b. It is actually the leg 192a that is secured to the arm 190, and it is this leg 192a that provides the pivotal mounting of the arm 190, the leg 192a being journaled in the side walls 108 of the U-shaped bracket 104. As can be readily noted from FIG. 1, the leg 192b of the rod member 192 extends upwardly and has an offset end portion 192c that overhangs the top of the casing 100. In the solid line position of the rod member 192, that is, with the end portion 192c inbound, the operator, when looking back, can immediately learn that the clutch mechanism 88 is disengaged, which is the condition depicted in FIG. 7. On the other hand, when the rod member 192 is in the dotted or phantom position, that is, with the end portion 192c outboard, the operator knows that the clutch mechanism 88 is engaged, which is the condition illustrated in FIG. 8.

Having presented the foregoing description, the manner in which my top dresser 10 functions should be readily understood. Nonetheless, in order that the benefits to be derived from a practicing of my invention may be fully appreciated a brief operational sequence will be given.

Assuming that the top dresser 10 has been coupled to a utility vehicle via the hitch component 16, the top dresser 10 is towed to a loading site. Even though the hopper 36 is empty, the grounds keeper will normally not wish the conveyor 40 and the brush 80 to be operational. Only a rearward glance at the rod member 192 is needed in order to acertain whether the clutch mechanism 88 is disengaged. If the rod member 192 is in the solid line position appearing in FIG. 1, the operator knows that the clutch mechanism 88 is disengaged, the condition shown in FIG. 7. With the clutch mechanism 88 disengaged, the top dresser 10 can be pulled at a relatively high speed.

When the loading station is reached, the hopper 36 can be rapidly filled with soil, sand, a mixture thereof, or whatever material is to be applied to the particular turf to be treated. The conveyor 40 is structured so that the hopper 36 can have a lateral width sufficient to receive material from the shovel 200 mounted on a front end loader, only the boom members 202 thereof being fragmentarily shown in FIG. 1. The dressing material being dumped into the hopper 36 has been given the reference numeral 204.

Prior art constructions have not permitted use of front end buckets on tractors for loading. Once loaded, the top dresser 10 can be towed to where the material 204 is to be distributed or spread. Transport speeds of 20 miles per hour and more have been reached, considerably in excess of the six to ten miles per hour speeds employed when the apparatus is actually being used to dispense the material onto the ground. The rapid loading and the rapid movement to and from loading sites renders my dresser 10 especially efficient and versatile. In the past it has been customary to transport the dressing material to the green or location where the material is being applied. This has necessitated a first loading at the storage site into a truck or cart, and a reloading at the dispensing site into the hopper of the top dresser for spreading onto the ground. Such a procedure requires both more time and equipment.

When the area to be dressed is reached with my top dresser 10, the operator pulls the rope or cable 158 to cause the lever arm 156 to rock the shaft 152 in a direction to lift the actuating rod 146. This in turn results in the rocker arm 142 rotating in a clockwise direction as viewed in FIGS. 1 and 7. Since the rocker arm 142 is integral with the shaft 130, the shaft 130 acts through the one-way clutch 140 to rotate the tubular shaft 132 with the consequence that the octagonal cam 134 is indexed in the direction of the arrow 138. This causes one of the flats 136a, 136c, 136e or 136g to move into juxtaposition with the wear plate 126. The flat 136a is the one illustrated in FIG. 8 that is permitting the spring 96 to move the jaw member 92 against the jaw member 90, the jaw member 90 being affixed to the shaft 26. The one-way action of the clutch 140 permits the rocker arm 142 to resume its unrocked position under the influence of the return spring 162. This also returns the lever arm 156 back to its original and normal position.

With the clutch mechanism 88 engaged, the sprocket 94 rotates when the wheels 18, 20 rotate. Rotation of the sprocket 94 causes the sprockets 178, 180 to rotate by reason of the chain 168 being entrained about the sprockets 94, 170.

Inspection of FIG. 5 will make it clear that the gear 182 on the conveyor shaft 62 is considerably larger in diameter than is the pinion gear 172. This relation causes the conveyor belt 44 to be driven relatively slow. The brush 80, as can be understood from FIG. 6, is driven relatively fast by reason of the sprocket 186 being considerably smaller than the larger sprocket 170.

Inasmuch as the top dressing material 204 gravitationally flows downwardly through the open bottom 36f of the hopper onto the belt 44, a ribbon of material is moved rearwardly beneath the gate 70 by action of the moving belt 44. The amount the gate 70 is open determines the vertical thickness of the ribbon; this is an adjustable parameter whereas the width of the ribbon is predetermined by the width of the hopper 36. Hence, the ribbon has a fixed width in practice of five feet, and a variable height or thickness to enable relatively large variations to be achieved in the quantity of material dispensed. The comparatively high rotation rate of the brush 80 accelerates the ribbon material, propelling it into the ground.

It will be appreciated that in dressing golf tees, fairways, athletic fields and the like, one wishes to dispense top dressing with a predetermined amount per square foot area to be covered. No matter what the speed of my top dresser 10, the dispensing rate will be substantially the same for a given setting of the gate 70. Stated somewhat differently, if the traversing speed is increased, the speed of the conveyor 40 will be correspondingly increased; if the traversing speed is decreased, the conveyor 40 will be correspondingly slowed. The result is that the amount of dressing material being distributed or spread onto the ground will be virtually the same for whatever speed the dresser 10 is pulled.

In achieving the uniform dispensing mentioned above, it should be understood that the use of the two overriding clutches 30, 32 play an important role in realizing the degree of uniformity that results from utilizing my top dresser 10. If the wheels 18a, 18b are moving faster, they determine the dispensing rate, doing so through the clutch 30; if the wheels 20a, 20b are moving faster, they determine the dispensing rate, doing so via the clutch 32. Hence, when making a turn to the left, the conveyor belt 44 and the cylindrical brush 80 will be driven through the agency of the clutch 32, whereas during a turn to the right, the belt 44 and brush will be driven via the clutch 30. Admittedly, when making turns, especially sharp ones, more top dressing will be deposited per square foot on the "slow" side than on the "fast" side.

It should also be appreciated that when the top dresser is moved rearwardly, both clutches 30, 32 override so that no dispensing occurs. In other words, the conveyor 40 does not function, its belt 44 remaining motionless. The operator does not have to close the gate 70, nor does he have to disengage the clutch mechanism 88 by pulling on the rope or cable 158; instead, the dispensing is automatically discontinued due to the overriding action provided by the two clutches 30, 32.

In view of the foregoing, it should be evident that my top dresser 10 permits top dressing to be applied efficiently and effectively, yet affording an exceptional amount of convenience to the operator or grounds keeper in the handling and controlling of the top dresser.

I claim:

1. A top dresser adapted to be pulled across the ground comprising frame means, wheel means supporting said frame means, a hopper extending transversely of said frame means having a lower opening through which material contained in said hopper is discharged, a conveyor belt mounted for movement beneath said hopper for receiving material discharged through said opening and moving such material rearwardly relative to the direction the dresser is pulled, a cylindrical brush mounted for rotation about an axis generally parallel to said hopper so as to engage and propel material from said belt into the ground, said wheel means including at least a first wheel subjacent the left side of said frame means and at least a second wheel subjacent the right side of said frame means, and means connecting said conveyor belt and cylindrical brush to said wheel means so that said belt and brush are both ground driven by said wheel means, said means connecting said conveyor belt and said cylindrical brush to said wheel means including a remotely operated clutch comprising a multi-faced cam and a one-way clutch mechanism, said one-way clutch mechanism indexing said cam by one face each time it is actuated, and including a flexible actuator for actuating said one-way clutch mechanism, said overrunning clutches preventing said conveyor belt and said cylindrical brush from operating when the top dresser is pushed backwards.

2. A top dresser comprising frame means, a shaft beneath said frame means, wheel means on said shaft for supporting said frame means for movement across the ground, a first clutch member secured to said shaft, a second clutch member movable along said shaft, spring means manually biasing said second clutch member into engagement with said first clutch member, indexing means for overcoming the biasing action of said spring means to disengage said second clutch member from said first clutch member including a rotatable cam having a plurality of first and a plurality of second portions, said second portions being angularly disposed between said first portions, a pivotal arm in engagement with said spring means and selectively engageable by said cam portions, any one of said first cam portion overcoming the biasing action of said spring means to disengage said second clutch member from said first clutch member, and any one of said second cam portions permitting said spring means to effect engagement of said second clutch member with said first clutch member, a hopper surmounting said frame means having an open bottom, conveyor means disposed beneath said open bottom, and means connected to said second clutch member for operating said conveyor when said second clutch member is engaged with said first clutch member to dispense material from said hopper onto the ground being traversed by said wheel means.

3. A top dresser comprising frame means, wheel means beneath said frame means for supporting said frame means for movement across the ground, a hopper surmounting said frame means having an open bottom, conveyor means disposed beneath said open bottom, a shaft rotatable by said wheel means, a clutch mechanism for connecting said shaft to said conveyor means, a pivotal arm for causing engagement and disengagement of said clutch mechanism, a cam rotatable about an axis, said cam having a plurality of angularly spaced first flats and a plurality of angularly spaced second flats therebetween, said angularly spaced second flats being spaced a greater distance from said axis than said first flats are spaced from said axis, any one of said first flats, when engaging said pivotal arm, causing engagement of said clutch mechanism and any one of said second flats, when engaging said pivotal arm, causing disengagement of said clutch mechanism, and manually actuatable means for rotating said cam to alternately move a first flat and then a second flat into engagement with said pivotal arm.

4. A top dresser in accordance with claim 3 in which said manually actuatable means includes a rope or cable.

5. A top dresser in accordance with claim 3 in which said conveyor means includes an endless belt having a chain at each side, a pair or cog wheels in mesh with said chains, said cog wheels being connected to said shaft via said clutch mechanism when said clutch mechanism is engaged, first roller means extending between said cog wheels about which said belt passes, and second roller means spaced from said first roller means about which said belt also passes, said second roller means including cylindrical, untoothed portions about which said chains pass.

6. A top dresser in accordance with claim 4 including means visually indicating when said clutch mechanism is engaged and when said clutch mechanism is disengaged.

7. A top dresser in accordance with claim 6 in which said indicating means includes a rod member shiftable by said clutch mechanism.

8. A top dresser comprising frame means, wheel means beneath said frame means for supporting said frame means for movement across the ground, a hopper surmounting said frame means having an open bottom, conveyor means disposed beneath said open bottom, a shaft rotatable by said wheel means, a clutch mechanism for connecting said shaft to said conveyor means, a pivotal arm for causing engagement and disengagement of said clutch mechanism, a rotatable cam having angularly spaced first flats and angularly spaced second flats therebetween, any one of said first flats, when engaging said pivotal arm, causing engagement of said clutch mechanism, and any one of said second flats, when engaging said pivotal arm, causing disengagement of said clutch mechanism, manually actuatable means for rotating said cam to alternately move a first flat and then a second flat into engagement with said pivotal arm, and a one-way clutch for causing said manually actuatable means to rotate said cam in only one direction.

9. A top dresser in accordance with claim 8 including spring means for returning said actuatable means to its normal position, said one-way clutch permitting the return of said actuatable means to its normal position without rotating said cam in a reverse direction.

10. A top dresser in accordance with claim 9 in which said clutch mechanism includes a first jaw member affixed to said shaft and a second jaw member slidable on said shaft, a coil spring biasing said second jaw member into engagement with said first jaw member, any one of said first flats, when in engagement with said pivotal arm, permitting said coil spring to effect engagement of said second jaw member with said first jaw member and any one of said second flats, when in engagement with said pivotal arm, preventing said coil spring from effecting engagement of said second jaw member with said first jaw member.

11. A top dresser in accordance with claim 10 including a coil spring encircling said shaft, a pin on said pivotal arm for compressing said coil spring to effect disengagement of said clutch mechanism when any one of said second flats is in engagement with said pivotal arm and to permit expansion of said coil spring to effect engagement of said clutch mechanism when any one of said first flats is in engagement with said pivotal arm.

12. A top dresser comprising frame means, first and second wheel means beneath said frame means for supporting said frame means for movement across the ground, first overriding clutch means associated with said first wheel means, second overriding clutch means associated with said second wheel means, a shaft driven by said first clutch means when said first wheel means is rotating faster than said second wheel means and driven by said second clutch means when said second wheel means is rotating faster than said first wheel means, third clutch means including a first clutch member secured to said shaft and a second clutch member movable along said shaft, spring means normally biasing said second clutch member into engagement with said first clutch member, indexing means for overcoming the biasing action of said spring means to disengage said second clutch member from said first clutch member, a hopper surmounting said frame means having an open bottom, conveyor means disposed beneath said open bottom, and means connected to said second clutch member for operating said conveyor when said second clutch member is engaged with said first clutch member to dispense material from said hopper onto the ground being traversed by said first and second wheel means.

13. A top dresser in accordance with claim 12 in which said indexing means includes a rotatable cam having first and second portions, a pivotal arm in engagement with said spring means and selectively engageable by said cam portions, said first cam portion overcoming the biasing action of said spring means to disengage said second clutch member from said first clutch member and the other of said cam portions permitting said spring means to effect engagement of said second clutch member with said first clutch member.

14. A top dresser in accordance with claim 13 in which said indexing means includes a one-way clutch for rotating said cam.

15. A top dresser in accordance with claim 13 including a rocker arm for advancing said one-way clutch in one direction, and manually actuatable means for advancing said one-way clutch.

16. A top dresser in accordance with claim 13 in which said first and second cam portions constitute first and second flats, respectively, said first flat being located at a greater distance from the axis of rotation of said cam than said second flat is rotated.

17. A top dresser in accordance with claim 16 including additional first flats and additional second flats, said first flats being alternately disposed with respect to said second flats.

18. A top dresser in accordance with claim 17 in which said first flats total four in number and said second flats total four in number.

* * * * *